March 30, 1937.  G. W. EMRICK  2,075,031
CHUCK DEVICE
Filed May 2, 1935
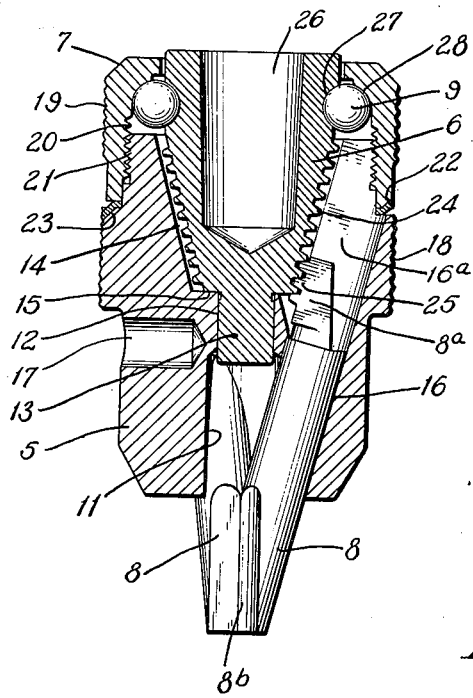
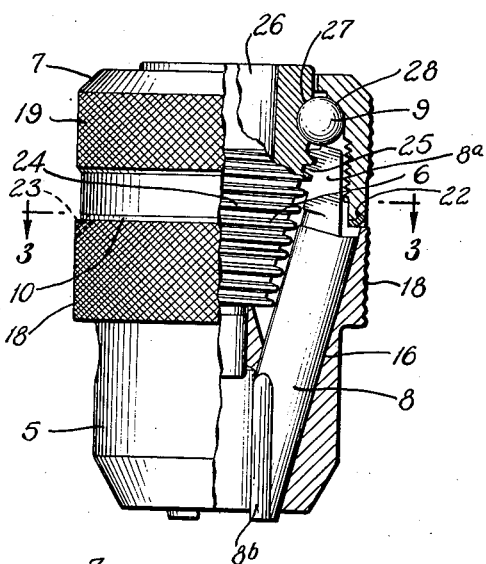
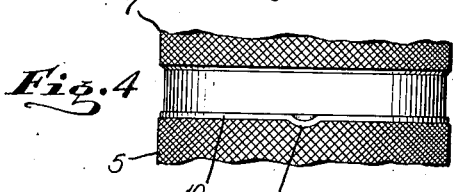
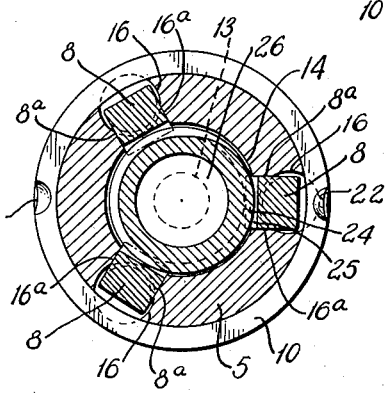
INVENTOR
GEORGE W. EMRICK
BY
*Howard E. Thompson*
ATTORNEY Patented Mar. 30, 1937

2,075,031

UNITED STATES PATENT OFFICE 2,075,031

CHUCK DEVICE

George W. Emrick, Brooklyn, N. Y.

Application May 2, 1935, Serial No. 19,385

3 Claims. (Cl. 279—63)

This invention relates to what are commonly referred to as chuck devices for use in drilling and boring as well as in conjunction with devices, machines or apparatus of various kinds and classes; and the object of the invention is to provide a chuck device which may be quickly and easily operated in clamping a tool therein or in releasing a tool therefrom and wherein better wearing qualities are provided; a further object being to provide a chuck device, the construction of which or the several parts thereof has been materially simplified; a further object being to provide a ball bearing mounting between the cap of the chuck and the cone thereof to compensate for the different thrusts to which the device is subjected as well as to maintain the cone in centralized position and to reduce wear upon the chuck parts, and still further in relieving any tendency of the cone and jaws to screw apart; a further object being to so mount the jaws as to permit the engagement of the upper ends thereof with the bearing balls when the chuck is open, thus serving as stops which will prevent the sticking of the jaws when in open position; a still further object being to provide a simple, economical and yet effective manner of securing the cap to the body of the chuck by means of a ring, the thickness of which may be varied in the manufacture of the device as well as in making repairs to provide proper fitting of the cone within the chuck body; and with these and other objects in view, the invention consists in a chuck device of the class and for the purpose specified, which is simple in construction, efficient in use, and which is constructed as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal sectional view through a chuck made according to my invention.

Fig. 2 is a side and sectional view showing parts in a different position.

Fig. 3 is an irregular section on the line 3—3 of Fig. 1; and,

Fig. 4 is a face view of a part of the chuck, illustrating a locking or keying means between certain parts.

In the drawing, 5 represents the chuck casing or body; 6 the cone; 7 the cap; 8 the jaws; 9 the bearing balls; and 10 the spacing and lock or key ring. The body 5 has at the lower end thereof a tool receiving bore 11 and centrally with a reduced bore 12 forming a guide and bearing for the lower projecting stud 13 on the cone 6. Above the bore 12, the body 5 is provided with an enlarged conical bore 14 terminating at its lower end in a seat 15 adjacent which the lower end of the cone 6 is arranged. The body 5 also includes a plurality of angular bores or passages 16 which open into the bore 11 and through the upper end of the body and in which the jaws 8 are mounted.

The body 5 also includes an aperture 17 in one side wall thereof to receive an operating rod or tool facilitating the opening and closing of the chuck as will be apparent. Centrally of the body 5 is an enlarged nurled portion 18 by means of which the chuck may be operated by hand, the cap 7 having a similar nurled portion 19 which also facilitates this operation. The cap 7 is internally threaded as seen at 20 to engage an externally threaded portion 21 of the body in coupling said parts together, the outside diameters of the body and cap being substantially the same. Between the lower end of the cap and the upper end of the enlarged nurled portion 18 is disposed the ring 10, a portion of which may be flexed upwardly into a recess 22 in the cap as seen at the right of Fig. 1, and downwardly into a recess 23 in the body as seen at the left of Fig. 1, and also in Fig. 4 of the drawing. These offsets serve to key the cap and body against rotation one with respect to the other. At this time, it will also be apparent that the thickness of the ring 10 will govern the arrangement of the lower end of the cone upon the seat 15 to avoid excessive friction of the cone on this seat, and from time to time, and if necessary at any time, a new ring may be substituted to compensate for any wear between the cone and the bearing surface 15.

The cone 6 is provided with an external screw thread 24 adapted to be engaged by threaded portions 25 on the inner ends of the jaws 8 as clearly seen in Figs. 1 and 2 of the drawing. The cone is provided with a tapered bore 26 opening through the upper end thereof to receive a spindle in the usual manner and the side wall of the cone adjacent the upper end thereof is provided with an annular groove 27 in which the bearing balls 9 seat. The cap 7 has an annular groove 28 in which the balls 9 are adapted to seat. It will be noted that the groove 28 is formed in the corner portion of the cap and opens freely through the bottom thereof so as to compensate for lateral as well as longitudinal thrusts. The bearing balls serve to maintain the cone in centralized position, thus eliminating excessive wear of the stud 13 in the bore 12. The jaws 8 are adapted to extend into the chamber of the cap to engage the bearing balls 9 when moved upwardly in the manner indicated in Fig. 2 of the drawing, thus avoiding any tendency for the jaws to stick within the chuck body in this position, as has been experienced with other chuck devices of this kind. It will appear from a consideration of Fig. 3 of the drawing that the threaded portion 25 of the jaws 8 are flattened at opposite sides as indicated at 8a in said figure to engage flattened walls 16a at the upper end of the passage 16 to key the jaws against rotation in the chuck body and to maintain the lower beveled jaw ends 8b thereof in proper alinement one with respect to the other.

It will appear from the foregoing that my improved chuck device comprises comparatively few operating parts and the separate parts are all of simple construction, thereby materially reducing the manufacturing costs and at the same time, facilitating the assemblage of the parts. By using the ring construction 10, a very simple and yet effective means is provided for properly mounting the cone within the chuck body as well as in keying the cap and chuck together after these parts have been properly assembled. It will be understood that the ring 10 is normally of straight wall construction, and the offsets at 22 and 23 are made in the ring by the use of a suitable tool. It will also appear that the chuck may be moved into operative or engaging position and released therefrom in a simple and effective manner, the excessive frictions between the parts being materially reduced by the use of the bearing provided.

It will be apparent that the particular design and contour of the respective parts of my improved chuck device are merely illustrative of one method of carrying the invention into effect, and this is also true of the proportionate size of the respective parts, the distinctive features residing in the combination longitudinal and radial thrust bearing having the further feature of self-centering the cone within the chuck body and in utilizing the bearing balls as a stop and thrust for the jaws of the chuck and the spacing and lock ring employed.

Having fully described my invention, what I claim as new and desire to secure by Letters Patent, is:

1. A chuck device comprising a body having jaws movable longitudinally and radially therein, a cone mounted in the upper end of said body and including a bearing at the lower end thereof in the central portion of said body, means on the cone engaging the jaws for actuating the same, a cap detachably coupled with said body and encircling said cone, a plurality of bearing balls arranged between the cap and said cone above said body to centralize the cone within said cap and body, and the upper ends of said jaw members being exposed to said bearing balls through the upper end of said body and adapted to engage the same to limit upward movement of said jaw members.

2. A chuck device comprising a body having jaws movable longitudinally and radially therein, a cone mounted in the upper end of said body and including a bearing at the lower end thereof in the central portion of said body, means on the cone engaging the jaws for actuating the same, a cap detachably coupled with said body and encircling said cone, a plurality of bearing balls arranged between the cap and said cone above said body to centralize the cone within said cap and body, the lower end portion of the cone seating in said body, means including a spacing ring disposed between the cap and body for gagging the mounting of said cone in said body, and means on the cap and body engaged by parts of said ring for keying the cap and body against rotation one with respect to the other.

3. In a chuck device of the class described consisting of a chuck body and a plurality of jaw members angularly arranged in and movable longitudinally with respect to said body with means engaging the jaw members for moving the same into open and closed positions, and a plurality of bearing balls arranged and supported in predetermined position at the upper end of the chuck body for engagement with the inner or upper ends of said jaw members in the inward or upward movement thereof to prevent the sticking of said jaw members in said chuck body.

GEORGE W. EMRICK.